Nov. 13, 1951     A. T. DEUTSCH     2,574,548

ROLL MACHINE

Filed July 27, 1945     2 SHEETS—SHEET 1

INVENTOR.
Alexander T. Deutsch
BY
Murray, Sackhoff & Paddack
ATT'YS

Nov. 13, 1951 A. T. DEUTSCH 2,574,548
ROLL MACHINE
Filed July 27, 1945 2 SHEETS—SHEET 2
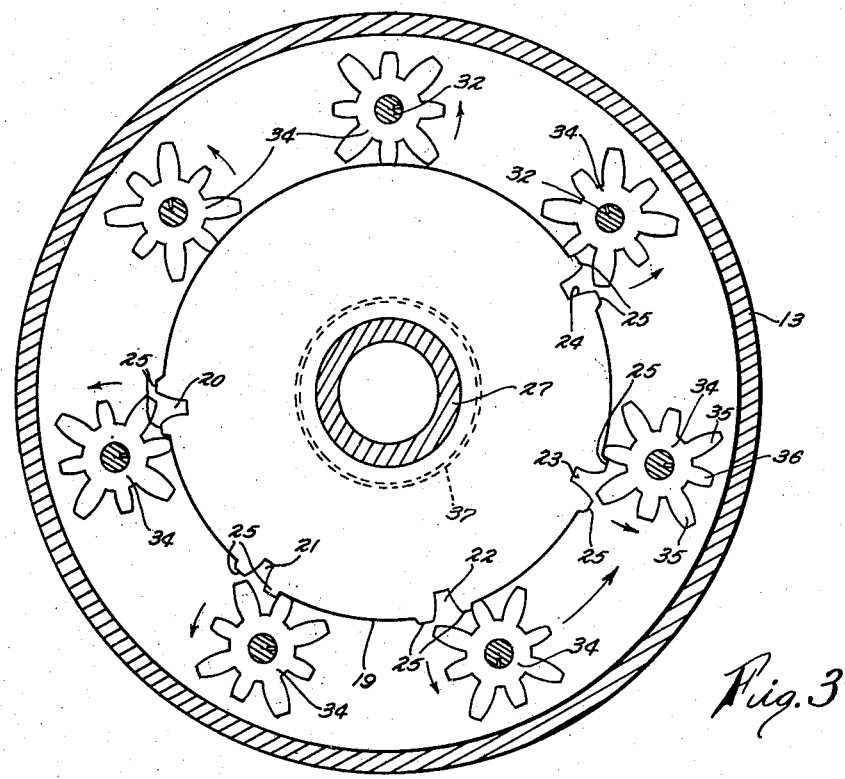
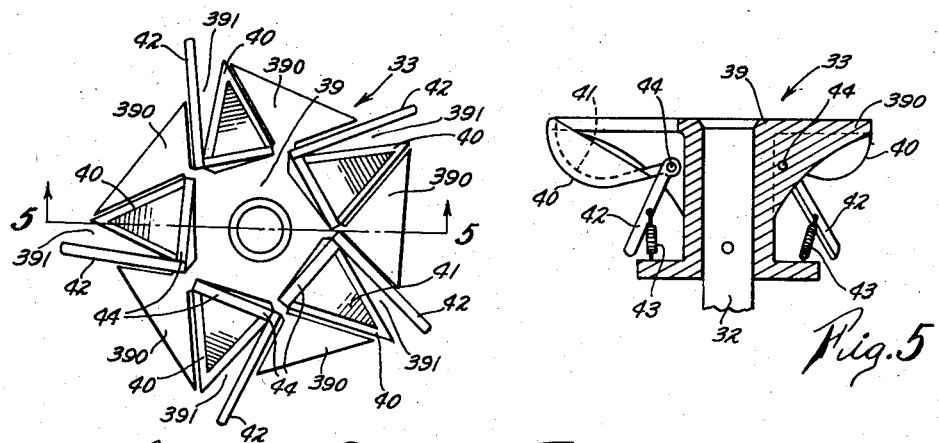
INVENTOR.
Alexander T. Deutsch
BY
Murray, Sackhoff & Paddack
ATT'YS Patented Nov. 13, 1951

2,574,548

UNITED STATES PATENT OFFICE 2,574,548

ROLL MACHINE

Alexander T. Deutsch, Cincinnati, Ohio

Application July 27, 1945, Serial No. 607,317

11 Claims. (Cl. 107—9)

1

The present invention relates to machines for bakeries and particularly to a machine for forming folded bakery products, and has for an object the provision of a device for automatically producing finished bakery products such as filled or unfilled folded dough forms, kaiser rolls and the kindered products of various shapes and kinds.

Another object of the invention is to provide a device of the class described which automatically and successively folds a plurality of edge portions of a single piece of sheeted dough toward the center thereof for mechanically producing shaped bakers articles including these which have been heretofore successfully made only by skilled hand labor.

Another specific object of the invention is to provide a mechanism, which may be power driven, for mechanically forming bakers' products, such as certain types of rolls with superposed overlapping edge portions.

These and other objects are attained by the means described herein and exemplified in the accompanying drawings.

Fig. 3 is a cross-sectional view taken on line 3—3 of Fig. 2.

Fig. 4 is an enlarged plan view of a folding device forming part of the invention, parts being broken away.

Fig. 5 is a cross-sectional view taken on line 5—5 of Fig. 4.

Fig. 6 is a perspective view of the finished and baked product of the machine illustrated.

Fig. 7 is a perspective view of a filled folded roll of known type, the production of which is contemplated with the use of machines of the character described herein.

Heretofore certain types of bakery products of both the sponge and sweet dough types and of filled or unfilled nature have been produced in a satisfactory manner only by the hand work of relatively skilled bakers. The desirability of many of these particular products has heretofore led to attempts to produce some of these products by machines, but these attempts have been without notable success. This is especially true of a type of large breakfast roll which is known as a kaiser roll which has heretofore completely defied attempts to mechanically reproduce the textural qualities of the end product as made by

2 hand by skilled roll bakers. The particular skill involved in producing such a roll lies in folding over a plurality of edge portions of a disc or a piece of sponge without materially creasing the dough at the fold with but a certain biasing or stretching pressure applied across one folded and overlapped edge thereof. The roll, when baked, rises to exceptional proportions forming a crown-like mass with a hard thin friable crust beneath which is a layer of baked dough of normal density while the center of the roll contains a globular mass of dough of normal density which is attached to the innersurface portion of the roll by a greatly expanded and lightly attenuated dough section.

The automatic device of the invention is illustrated as constructed for the production of this difficulty made type of roll and it will be understood from the ensuing description that other products of the fold-over type may be designed by making incidental modifications in the number and the contour of the folding elements or fingers.

Figure 1:
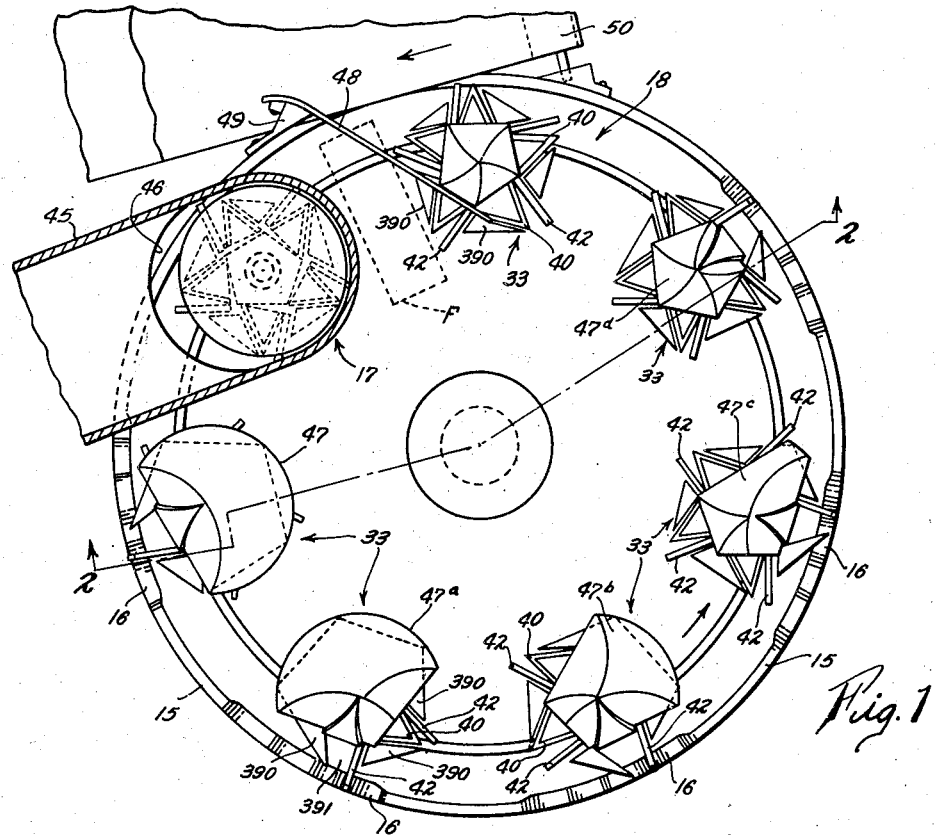
Fig. 1 is a top plan view of a device of the invention arranged for producing five overlapping edge folds on a piece of dough, with associated automatic feed and discharge means.
Figure 2:
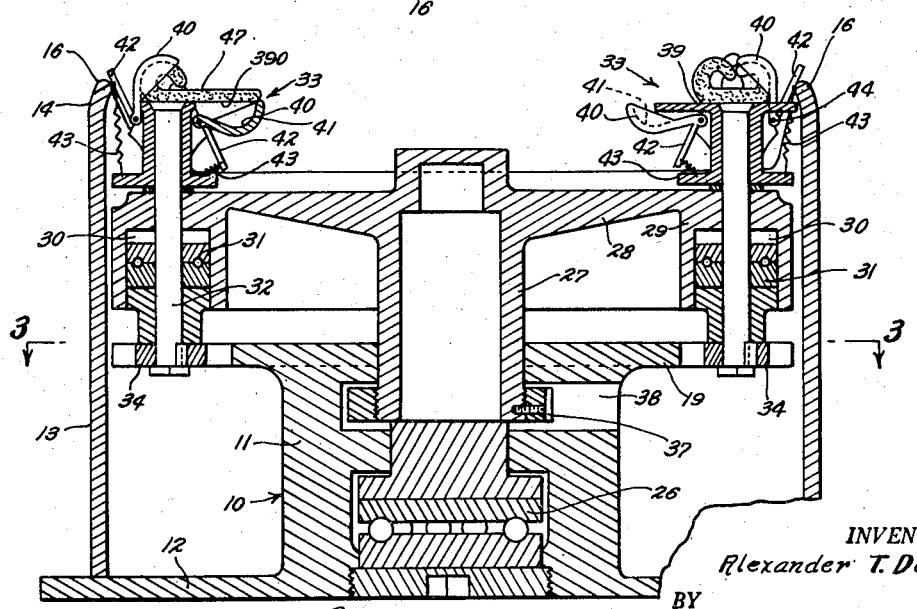
Fig. 2 is a cross-sectional view taken on line 2—2 of Fig. 1.

Reference is now made to Figs. 1 and 2 wherein a standard or base 10 comprising a hollow upright column 11 and a flange or foot 12 is arranged to be suitably mounted upon a bench or other surface where the operation of the roll making machine of the invention is to be carried on. Secured on the flange 12, concentrically with the upright column 11 is a cylindrical casting 13 having its top edge inwardly turned as at 14 and cut away at spaced intervals of predetermined number and shape, as at 15 to provide peaks or cam points 16 upon which the roll-folding device hereinafter described is caused to engage and operate. The number of teeth or cam points 16 is in each instance equal to the number of folds to be imparted to the roll blank or dough section to be operated upon. Each of the points 16 constitute a station about the top circumference of cam cylinder 13, in addition to which there are two additional stations, namely a loading station at 17, and a discharge station at 18 which are spaced from each other and from the adjacent peaks. The top of the upright column 11 is developed into an interrupted toothed gear 19 which is notched at 20, 21, 22, 23 and 24 on radial centers with the cam peaks 16. On each side of each of the aforesaid notches the periphery of the stationary gear wheel 19 are disposed half-teeth 25. Suitably mounted in the hollow bottom center of the base 10 is an anti-friction end bearing 26 which supports the vertical rotatable stud shaft 27 which is provided with a horizontal table or spider 28 with a depending peripheral skirt 29. Uniformly spaced about the circumference of the skirt are the bores 30, equal in number to the number of stations about the cylindrical casting 13. Each bore has mounted therein an anti-friction bearing 31 which suitably supports an upright shaft 32 upon which is carried one of the folding devices indicated generally as 33. On the bottom end of each shaft 32 is a pinion 34 having alternate long teeth 35 and intermediate short teeth 36 which cooperate with the notches 21—24 inclusive and the associated half-teeth 25. Upon rotation of the table 28 relative to the fixed gear flange 19, the shafts 32 have imparted thereto intermittent partial rotational movement so that the folding devices 33 are caused to travel slowly in a circle as the shaft 27 is rotated while the supporting shafts 32 serve to intermittently rotate the folding devices about their respective centers.

The drive for the shaft 27 may be effected by a power driven chain (not shown) passing about a sprocket 37 which is fastened to shaft 27 and is disposed within a lateral recess 38 in column 11.

The folding devices 33 as herein exemplified are arranged to provide five inwardly folded portions on each piece of dough which is disposed thereon during a complete cycle of operation of the machine of the invention. It will be understood from the description of this machine and the operation thereof, that a greater or lesser number of folds can be arranged by increasing or reducing the number of stations and the actuating parts of the machine.

Reference is now made to Figs. 4 and 5. Suitably fixed to the shaft 32 is a flat topped plate 39 which has a pentagonal shape in the center with spaced apart wings 390 providing between them notches or ways 391. On each of the inner bounding sides of plate 39, and movable in one of the ways 391, is hingedly mounted a folding finger 40. The hinged mounting of the finger is in non-parallel relation with the side of the plate to which it is hinged (see Fig. 4) and the upper face 41 of each finger presents a plane that is curved in two directions, thus forming a sort of center concavity. The fingers 40 each have an operating lever 42 connected thereto and adapted to follow the top edge of the cylindrical casting 13 during a predetermined portion of a complete cycle of operation of the machine. The function of the lever 42 is to ride up onto the peaks or cam points 16 and in doing so to swing the associated finger 40 upwardly about its hinged mounting so that the point of the finger overhangs approximately the center of the folding device as shown, for example, in Fig. 2. The lever 42 performs substantially a counter-weight return operation as it is moved beyond the points or peaks 16. A spring 43 is operatively connected to each of the levers 42 for yieldably holding it outstretched with the tip of the finger approximately in the plane of plate 39 and the wings 390 of said plate. In the embodiment illustrated for forming the breakfast roll of Fig. 6 it is desirable to have the hinge mounting 44 of each finger 40 disposed below the top of plate 39 as well as at a slight angle to the side of the inner pentagon.

From the foregoing it will be seen that as the table or spider 28 is slowly rotated, the folding devices 33 will be intermittently turned on the shafts 32 and the cam levers 42 on the successive folding fingers 40 will ride up onto the cams 16 and the fingers 40 will each receive an upward and inward impulse once during a complete cycle of operation. A flat disc or piece of dough supported on the plate 39 and its wings will thus have successive edge portions turned upwardly and pressed into the center thereof with a twisting action due to the non-parallel hinged relation of the finger 40 with the center plate 39 of the folding device. The successive action of these fingers will also be understood to effect an overlap of the end of each succeeding fold on the adjacent end of the preceding fold. This particular action for making a breakfast roll has heretofore been incapable of attainment by ordinary types of molds or the like and, in the case of certain types of breakfast roll hereinbefore mentioned, the especially desired physical properties of the finished roll have been realized only by skilled hand work of a properly trained baker.

At this point it may be stated that when a different type of folded bakery product is desired in which the overlap and twisting action is not required, the machine of the present invention may be modified to provide the folding fingers with a hinged connection in a parallel relation to the adjacent edge of the center piece instead of as herein illustrated.

The machine of the invention automatically produces a completely finished folded roll or the like and discharges one of them at the discharge station 18 as each of the folding devices is brought to that station.

In accordance with bakery machinery practice, a suitable flour duster (indicated in dotted outline at F) is disposed above the path of the folders and between the discharge station 18 and the loading station 17, thus assuring that the discs of dough to be formed will not adhere to the folders and resist discharge of the completed rolls at the discharge station.

The loading station 17 may consist of any suitable chute or tube 45 with an opening 46 fixed over the loading station at 17 so that as each of the folding devices 33 reaches said station it may receive a dough disc or piece 47.

Assuming that the table or spider 28 is slowly rotating, and the freshly loaded folding device 33 has arrived at the first of the peaks 16, one of the fingers 40, under the influence of cam lever 42 will impart a fixed fold to the dough piece. As the device continues to operate, a succeeding folding device passes from the loading station to receive a similar fixed fold, while the preceding folded piece of dough 47a has been turned through one-fifth (⅕) of a revolution and has had a second overlapping fold imparted thereto. In a similar fashion the pieces of dough 47b, 47c and 47d have each received additional folds so that at the latter station the folding operation is complete and the next impulse of the machine will carry it to the discharge or unloading station from which it is suitably removed by the following described mechanism.

In the herein disclosed fully automatic machine, any suitable discharge means may be used to remove finished rolls from discharge station 18. As shown an angularly disposed baffle 48 is supported from a bracket 49, and overhangs the path of the folders 43 so as to shift the finished roll therefrom, at the discharge station, onto a conveyor belt 50. I prefer, in this embodiment, to provide the baffle with a curved terminal end, bent in the direction of conveyor movement and overhanging the conveyor, in order to properly position the rolls intermediate the side edges of the conveyor.

The machine of the invention, designed to impart the desired number of folds to a flat disc or bun of dough, may be utilized to considerable advantage in connection with automatic baker's machinery since it will enable the production of a continuous series of folded dough articles without touching the dough by hand. In the case of a breakfast roll in which the edges of the folds are overlapped and slightly twisted, there is made possible the automatic production of an article which has heretofore been successfully made by skilled hand work only. As to all other folded dough products which do not have this peculiarity, the machine likewise is adapted to speedy production methods since the shaping units may readily be constructed to perform any of the fold-over operations including those that are sometimes performed by hand and by less skilled bakers.

It will also be understood that in the event the so-called filled bakery goods as shown in Fig. 7, for example, is to be made with the machine of the invention, the filling material may be introduced on top of the dough piece after it has been placed upon a folding device at the loading station and before it arrives in position for the first folding operation. This may be accomplished manually or by any suitable automatic filler discharge mechanism (not shown) and which latter may be either a separate mechanism or otherwise. As a result of the subsequent operation of the machine after deposit of the filler material on the flat dough piece, the peripheral portions of the dough piece will be folded up over the filler material which is thereby enclosed and retained therein during the baking process.

It will now be well understood, in view of the foregoing, that the folding device 33 of the invention may be designed to meet various requirements for folded baker goods. The angle of the hinge or folding connection is readily arranged for overlapping or non-overlapping folds. The number of fingers 40 corresponding to the required number of folds and a suitably related mechanism for actuating the fingers successively are the primary considerations in providing automatic folding machines of either simple or relatively complex design.

It is to be noted that in those rolls or bakery products wherein the folded and/or folded and overlapped portions of the dough are required to be effectively sealed together against opening in the proofing and baking operations, the contacting skin surfaces are required to be pressed together and merged with one another in the folding operation. In the hand making of the crown-shaped kaiser rolls, the skilled baker uses the endmost portion of the side of the thumb to exert this pressure. The shape of the human thumb precludes the possibility of imparting a narrow and long radial line of pressure contact so that in reality the hand folded kaiser rolls and others, are given only a crude approximation of the desired thin line of sealing pressure. The necessity for speed in folding and sealing the dough pieces in order to produce a quantity of the goods in time for delivery schedules has made it entirely impractical to attempt to utilize a hand tool or implement to provide a desired sealing of the folded dough into a completely closed and sealed body. Hence, there are frequent non-uniform rolls in a finished and baked batch which are definitely not considered first-class merchantable goods.

With the machine of the invention the rate of production is increased and the resulting product is enhanced in that the finished rolls are quite uniform because the edges of the curved fingers have the proper width and contour to assure the correct and uniform sealing of each of the folded and overlapped portions at the juncture thereof.

What is claimed is:

1. A dough-folding device comprising a suitably shaped, flat support for nonshiftably sustaining a corresponding center area of a piece of sheet dough of predetermined greater total area, a series of finger members mounted hingedly adjacent their rear ends about the periphery of the said support and adapted for reciprocation between a generally outstretched relation with the free ends in the plane of said support and a folded relation with said free ends over the center of said support, means yieldingly retaining all of the fingers in the first named position, and means to individually move the fingers to the last named position in predetermined order.

2. A dough-folding device for preparing folded bakery goods comprising a support for nonshiftably sustaining a predetermined center area of a deposited sheet of dough, spaced apart and generally radially extending finger members disposed about the periphery of the support, means yieldably urging the fingers to outstretched relation in a substantially flat, horizontal plane, with the top of the support for sustaining the margin of said sheet of dough, means mounting the fingers adjacent the rear ends for hinged movement from said outstretched position to a folded over relation with the free ends thereof overhanging the center of said support, and means to impart the last mentioned movement momentarily to the respective fingers in predetermined order.

3. A dough folding device comprising a regular polygon-shaped flat support, curved fingers hingedly mounted at their rear ends in non-parallel relation with the several sides of said support, means yieldably retaining the fingers outstretched, and means to successively move each finger momentarily about its hinged mounting against the resistance of the tensioning means while adjacent fingers remain outstretched with the free ends thereof defining the opposite ends of a fold line on a piece of dough supported thereon.

4. A breakfast roll folder comprising a polygonal center support, a series of fingers each concaved intermediate the edges and hinged at its rear end in non-parallel relation to a side of the center support for movement to and from a position overhanging the center support, stop means for the fingers and limiting movement thereof to a normally outstretched position, means yieldably urging the fingers to the last mentioned position, and means to momentarily move the fingers in predetermined sequence against the resistance of said yieldable means.

5. In a machine for automatically forming folded bakery products, the combination of a vertical shaft, a horizontal spider, a plurality of folding devices mounted on the spider in uniformly spaced relation about the axis of the shaft, said folding devices being bodily rotatable on their respective axes on said spider, each folding device comprising a center support and a plurality of outwardly extending, hinged fingers, a stationary ring cam concentric with the spider, means on each finger adapted for cooperation with said ring cam for moving the associated finger about its hinged mounting, means for rotating the spider relative to the ring cam and cooperating means for imparting intermittent rotary movement to each of said folding devices, whereby successive fingers of each of such devices are actuated through the agency of the ring cam.

6. In a machine for automatically forming folded bakery products, the combination of a vertical shaft, a horizontal spider, a plurality of folding devices mounted on the spider in uniformly spaced relation about the axis of the shaft, said folding devices being bodily rotatable on their respective axes on said spider, each folding device comprising a center support and a plurality of outwardly extending, hinged fingers, a stationary ring cam concentric with the spider, means on each finger adapted for cooperation with said ring cam for moving the associated finger about its hinged mounting, means for effecting relative rotation of the spider and ring cam, cooperating means for imparting intermittent rotary movement to each of said folding devices, whereby successive fingers of each of such devices are actuated through the agency of the ring cam, and means mounted in fixed relation with the ring cam for depositing flat dough pieces on the folders as they successively move beneath it.

7. In a machine for automatically forming folded bakery products, the combination of a vertical shaft, a horizontal spider, a plurality of folding devices mounted on the spider in uniformly spaced relation about the axis of the shaft, said folding devices being bodily rotatable on their respective axes on said spider, each folding device comprising a center support and a plurality of outwardly extending, hinged fingers, a stationary ring cam concentric with the spider, means on each finger adapted for cooperation with said ring cam for moving the associated finger about its hinged mounting, means for effecting relative rotation of the spider and ring cam, cooperating means for imparting intermittent rotary movement to each of said folding devices, whereby successive fingers of each of such devices are actuated through the agency of the ring cam, means mounted in fixed relation with the ring cam for depositing flat dough pieces on the folders as they successively move beneath it, and means mounted in fixed relation to the ring cam and including an intermittently movable pusher for discharging finished folded articles from the folding devices as they reach a predetermined position relative to the circumference of said ring cam.

8. In a dough-folding machine the combination of a base, a ring cam fixed therewith, an interruptedly toothed wheel fixed with said base, a rotatable spider mounted on said base, a plurality of folding devices journalled for rotation about their respective axes disposed in spaced relation about the periphery of said spider, a pinion fixed to each folding device and meshing with said toothed wheel whereby intermittent axial rotation is imparted to each folding device as the spider is rotated for carrying said folding devices bodily through a circular path, each folding device comprising a series of normally outstretched fingers which are successively engaged with and operated by said ring cam as said folding devices undergo interrupted predetermined planetary movement by rotation of the spider, and means to rotate said spider.

9. In a device of the class described a slowly rotatable spider, a series of folders comprising vertical shafts journalled at uniform intervals about the periphery of the spider, means for imparting an indexing movement to the respective folders as they travel with the spider, and means for imparting folding movement to peripheral portions of the respective folders as such portions are moved in the indexing movement to predetermined relation with the periphery of said rotating spider.

10. A dough-folding device comprising a support, a series of outwardly extending members mounted about said support for hinged movement between a generally outstretched relation with respect to said support and a folded relation with the free ends of said members overhanging substantially the center of said support, and means for reciprocating said members to and from the last mentioned position.

11. A dough-folding device for preparing folded bakery goods comprising a center support, spaced apart and generally radially extending hingedly movable members disposed about said support, means yieldably urging the members to outstretched relation in approximately the plane of the support, arms connected to said members and means cooperating with the arms, during relative rotation between said arms and said means, for moving the hingedly movable members to a position with the free ends thereof above the center of the support.

ALEXANDER T. DEUTSCH.

REFERENCES CITED

The following references are of record in the file of this patent:

UNITED STATES PATENTS

| Number | Name | Date |
| --- | --- | --- |
| 407,978 | Westerman | July 30, 1889 |
| 628,449 | Carr | July 11, 1899 |
| 1,209,939 | Costigan et al. | Dec. 26, 1916 |
| 1,289,209 | Lewison | Dec. 31, 1918 |
| 1,957,135 | Fabian | May 1, 1934 |
| 2,177,329 | Peters | Oct. 24, 1939 |
| 2,373,012 | Burdett et al. | Apr. 3, 1945 |